(12) United States Patent
Verhee

(10) Patent No.: US 8,282,158 B2
(45) Date of Patent: Oct. 9, 2012

(54) VEHICLE BODY STRUCTURE

(75) Inventor: Patrick Verhee, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 12/984,806

(22) Filed: Jan. 5, 2011

(65) Prior Publication Data

US 2012/0169090 A1 Jul. 5, 2012

(51) Int. Cl.
*B62D 25/06* (2006.01)
(52) U.S. Cl. ........................................................ 296/215
(58) Field of Classification Search .................. 296/210, 296/215
See application file for complete search history.

(56) References Cited

U.S. PATENT DOCUMENTS

| | | | | |
|---|---|---|---|---|
| 5,688,021 | A * | 11/1997 | Tomforde et al. | 296/203.01 |
| 7,802,842 | B2 * | 9/2010 | Vogt et al. | 296/210 |
| 7,832,796 | B2 * | 11/2010 | DiMarco et al. | 296/210 |
| 7,900,991 | B2 * | 3/2011 | Fallis et al. | 296/107.01 |
| 2003/0111871 | A1 * | 6/2003 | De Gaillard | 296/216.01 |
| 2004/0256892 | A1 * | 12/2004 | Bergmiller et al. | 296/220.01 |
| 2005/0116510 | A1 * | 6/2005 | Leroy et al. | 296/216.01 |
| 2005/0280291 | A1 * | 12/2005 | Storc et al. | 296/219 |
| 2007/0102966 | A1 * | 5/2007 | Hesse et al. | 296/216.01 |
| 2007/0182217 | A1 * | 8/2007 | Saleen et al. | 296/215 |
| 2008/0185876 | A1 * | 8/2008 | Vogt et al. | 296/210 |
| 2008/0258491 | A1 * | 10/2008 | Just et al. | 296/108 |
| 2010/0038932 | A1 * | 2/2010 | Comfort et al. | 296/216.08 |

FOREIGN PATENT DOCUMENTS

| | | | |
|---|---|---|---|
| DE | 10250019 A1 * | 5/2004 | |
| DE | 10341559 A1 * | 3/2005 | |
| DE | 102008049984 A1 * | 4/2010 | |
| EP | 1215066 A2 * | 6/2002 | |
| EP | 1657113 A1 * | 5/2006 | |
| FR | 2900658 A1 * | 11/2007 | |
| JP | 2005298720 A * | 10/2005 | |

OTHER PUBLICATIONS dodgeboy.net, Chrysler PT Cruiser Convertible, 2008, 2 pages.
U.S. Appl. No. 12/763,603, Vehicle Pillar Structure, filed Apr. 20, 2010, 25 pages.

* cited by examiner

*Primary Examiner* — H Gutman
(74) *Attorney, Agent, or Firm* — Brooks Kushman P.C.; Frank MacKenzie

(57) ABSTRACT

A vehicle is provided with a pair of front pillars extending upward from a vehicle body. A pair of rails extends rearward from the pair of front pillars. A pair of rear pillars extends downward and rearward from the pair of rails to the vehicle body. A pair of roof panels is spaced apart along the vehicle body longitudinal axis, and each panel extends inboard from a respective rail. A transparent roof panel is interposed between the roof panels.

19 Claims, 3 Drawing Sheets

VEHICLE BODY STRUCTURE

TECHNICAL FIELD

Various embodiments relate to body structures for passenger vehicles.

BACKGROUND

Passenger vehicles have passenger compartments defined by a plurality of pillars extending from the body that converge at a roof with doors and windows oriented between adjacent pillars. The pillars are often formed integrally into the structure of the vehicle body. The pillars are commonly named from front to rear in alphabetical order. Thus, the pillars on either side of the windshield are referred to as A-pillars. The next sequential pillars are referred to as B-pillars, which are typically located on either side of a first set of doors. The next sequential pillars are often referred to as C-pillars, which are typically located on either side of a second set of doors for a four-door sedan or other multiple-seating row vehicle, or on either side of a rear window for a two-door vehicle. The next sequential pillars are often referred to as D-pillars, which are typically located on either side of a rear window for a four-door sedan or other multiple-seating row vehicle. The body panel, the D-pillars, and the roof rails typically provide the structure for the rear window, which in turn provides the driver or passengers within the vehicle with visibility to the rear of the vehicle.

Pillars that are oriented within the passenger compartment region typically extend from a body panel to a roof frame. These pillars provide structural support to the passenger compartment from the body panel to the roof frame. These passenger compartment pillars typically cooperate with an associated door and/or window.

Passenger vehicles are also commonly equipped with transparent roof panels to allow light or ventilation for the passenger compartment. Various types include sunroofs, moonroofs, and panoramic roofs, which may be a single panel or a multiple panel system.

SUMMARY

In one embodiment, a vehicle is provided with a pair of front pillars extending upward from a vehicle body, a pair of rails extending rearward from the pair of front pillars, a pair of rear pillars extending downward and rearward from the pair of rails to the vehicle body, a pair of roof panels spaced apart along the vehicle body longitudinal axis, each panel extending inboard from a respective rail, and a transparent roof panel interposed between the roof panels.

In a further embodiment, the transparent roof panel provides additional visibility for an occupant of the vehicle, and the pair of roof panels provides structural support for the vehicle.

In an even further embodiment, each roof panel extends from adjacent to one of the front pillars to adjacent to a corresponding rear pillar.

In a further embodiment, each roof panel extends farther inboard at a location adjacent to the front pillars compared to a location adjacent to the rear pillars.

In an even further embodiment, the transparent panel has a first width adjacent to the front pillars and a second width adjacent to the rear pillars.

In a further embodiment, the second width is greater than the first width.

In an even further embodiment, the vehicle is also provided with a front header extending across the pair of front pillars or the pair of rails adjacent to the front pillars, and a windshield mounted to and supported by the front pillars, where the windshield and the transparent roof panel adjoin one another.

In a further embodiment, the vehicle is also provided with a rear header extending across the pair of rear pillars or the pair of rails adjacent to the rear pillars, and a rear window mounted to and supported by the supported by the rear pillars, where the rear header is interposed between the rear window and the transparent roof panel.

In an even further embodiment, the vehicle is provided with a pair of intermediate pillars interposed between the front pillars and rear pillars, where the pair of intermediate pillars extends downward from the pair of rails to the vehicle body.

In a further embodiment, the pair of intermediate pillars are positioned aft of rear passenger entrances defined by the vehicle body.

In an even further embodiment, the vehicle is provided with an intermediate header extending between the pair of intermediate pillars where the transparent roof panel extends over and is supported by the intermediate header.

In a further embodiment, the transparent panel has a first width in front of the intermediate header and a second width aft of the intermediate header, where the second width is greater than the first width.

In another embodiment, a vehicle is provided with a pair of front pillars extending upward and rearward from a vehicle body, a pair of rails extending rearward from the pair of front pillars, a pair of rear pillars extending downward and rearward from the pair of rails to the vehicle body, a front header extending between the pair of front pillars, and a rear header extending between the pair of rear pillars. The vehicle has a transparent roof panel extending from the front header to the rear header, with the transparent roof panel having a first lateral width adjacent to the front header and a second lateral width adjacent to the rear header. The vehicle also has a pair of roof panels, with each panel extending inboard from one of the rails to a corresponding side of the transparent roof panel.

In a further embodiment, the transparent roof panel provides visibility aft of the vehicle for an occupant of the vehicle.

In an even further embodiment, the vehicle is provided with a pair of intermediate pillars interposed between the front pillars and rear pillars, with the pair of intermediate pillars extending downward from the pair of rails to the vehicle body. The vehicle also has an intermediate header extending between the pair of intermediate pillars. The transparent panel extends over and is supported by the intermediate header.

In a further embodiment, the first lateral width of the transparent panel is adjacent to the intermediate header.

In an even further embodiment, the lateral width of the transparent panel increases linearly between the intermediate header and the rear header.

In a further embodiment, the vehicle is provided with a rear window supported by and extending between the rear pillars and the rear header.

In an even further embodiment, the rear header is lower than the intermediate header thereby causing the transparent roof panel to slope downwardly towards the read header. A vehicle occupant has rearward visibility through both the rear window and the transparent roof panel between the intermediate header and rear header.

In yet another embodiment, a vehicle is provided with a vehicle body having at least a pair of door openings, a pair of front pillars for extending upward and rearward from the vehicle body, a pair of rails extending rearward from the pair of front pillars, and a pair of rear pillars extending downward and rearward from the pair of rails to the vehicle body. The vehicle has a pair of roof panels, with each panel extending inboard from a respective side rail. The pair of roof panels are spaced apart along a longitudinal axis of the vehicle body. The vehicle also has a transparent roof panel interposed between the pair of roof panels. A lateral width of each of the roof panel decreases adjacent to the rear pillars.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
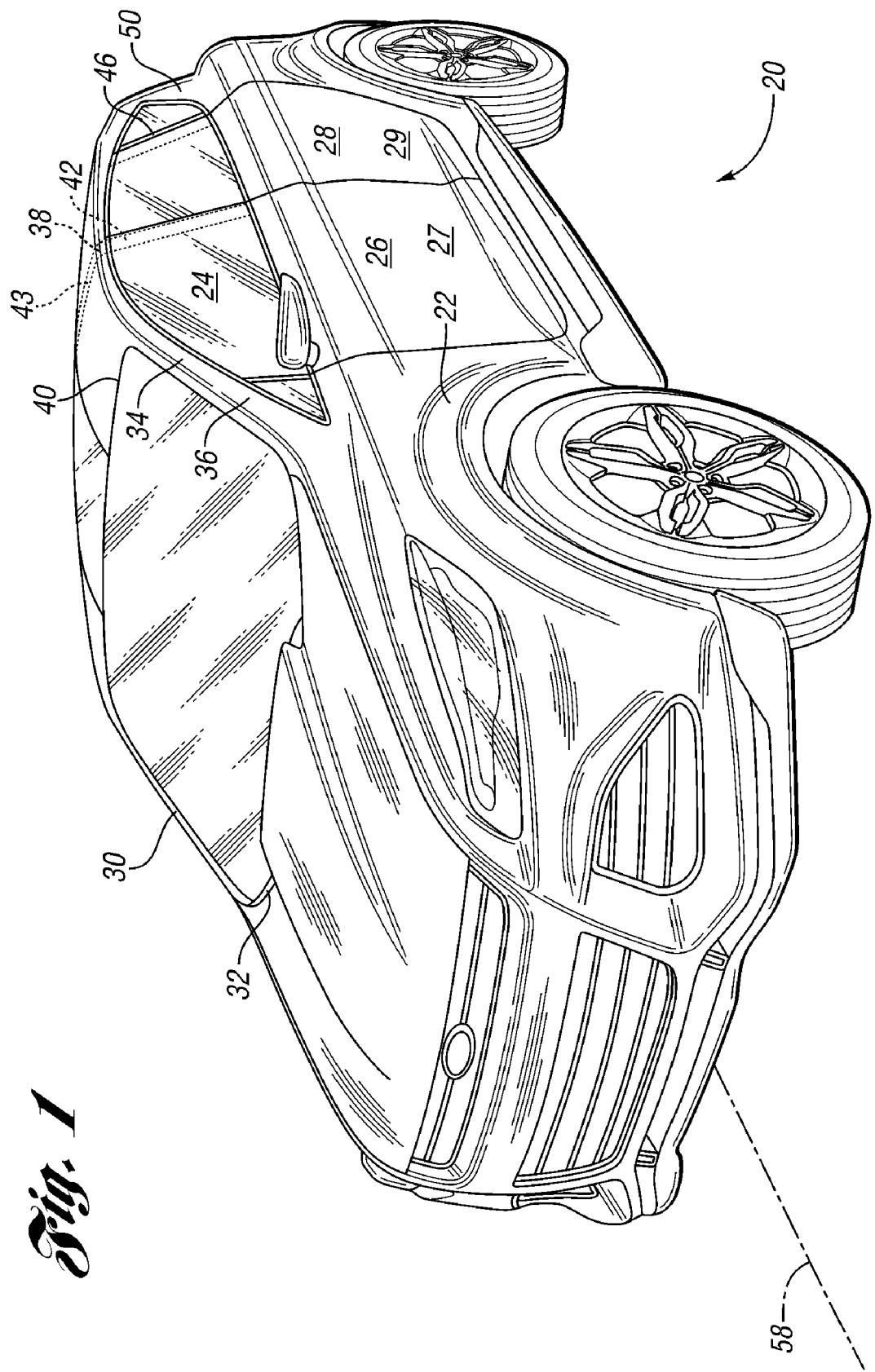
FIG. 1 is a perspective view of a vehicle having a pillar and roof structure according to an embodiment.
Figure 2:
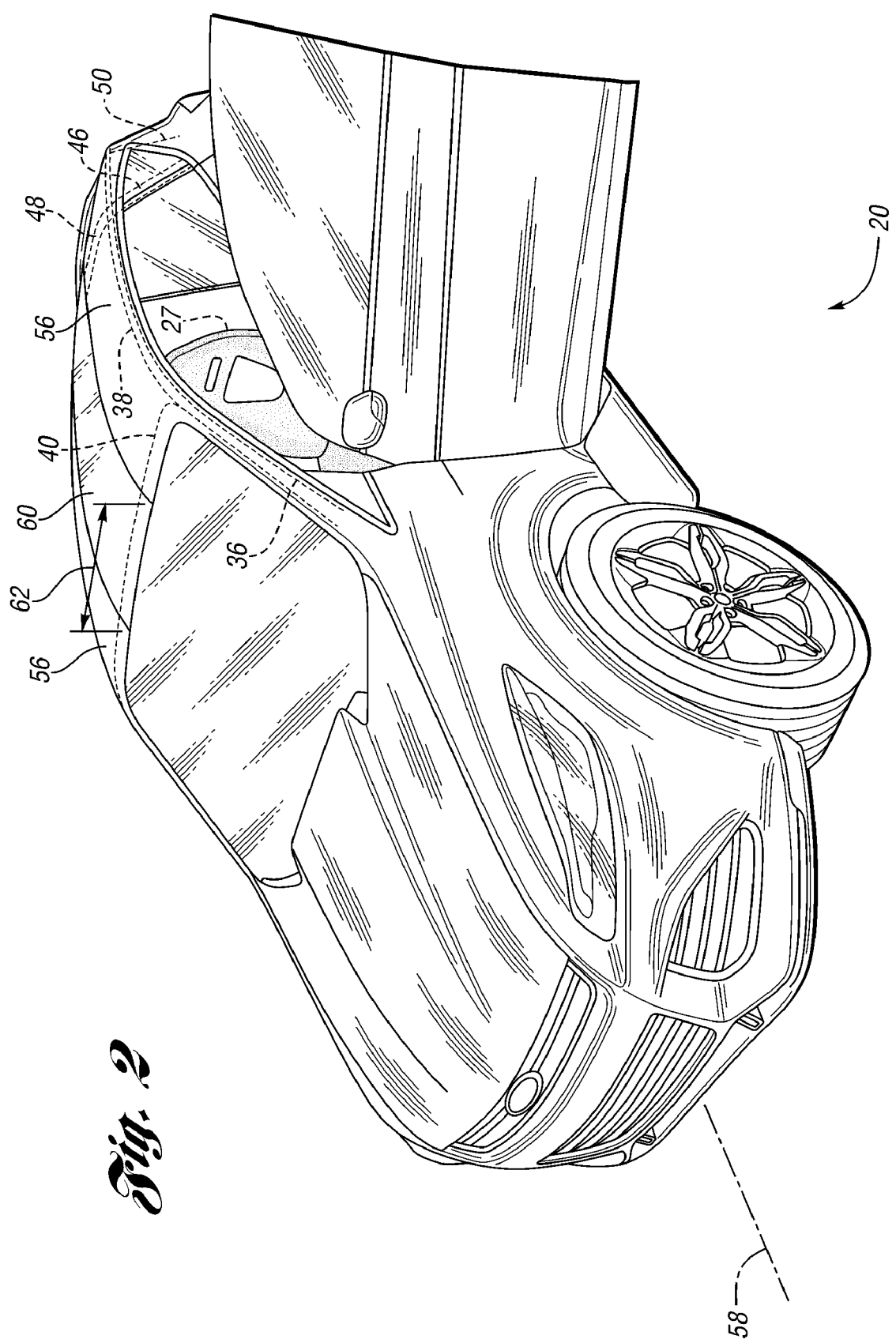
FIG. 2 is another perspective view of the vehicle with the pillar and roof structure as shown in FIG. 1.
Figure 3:
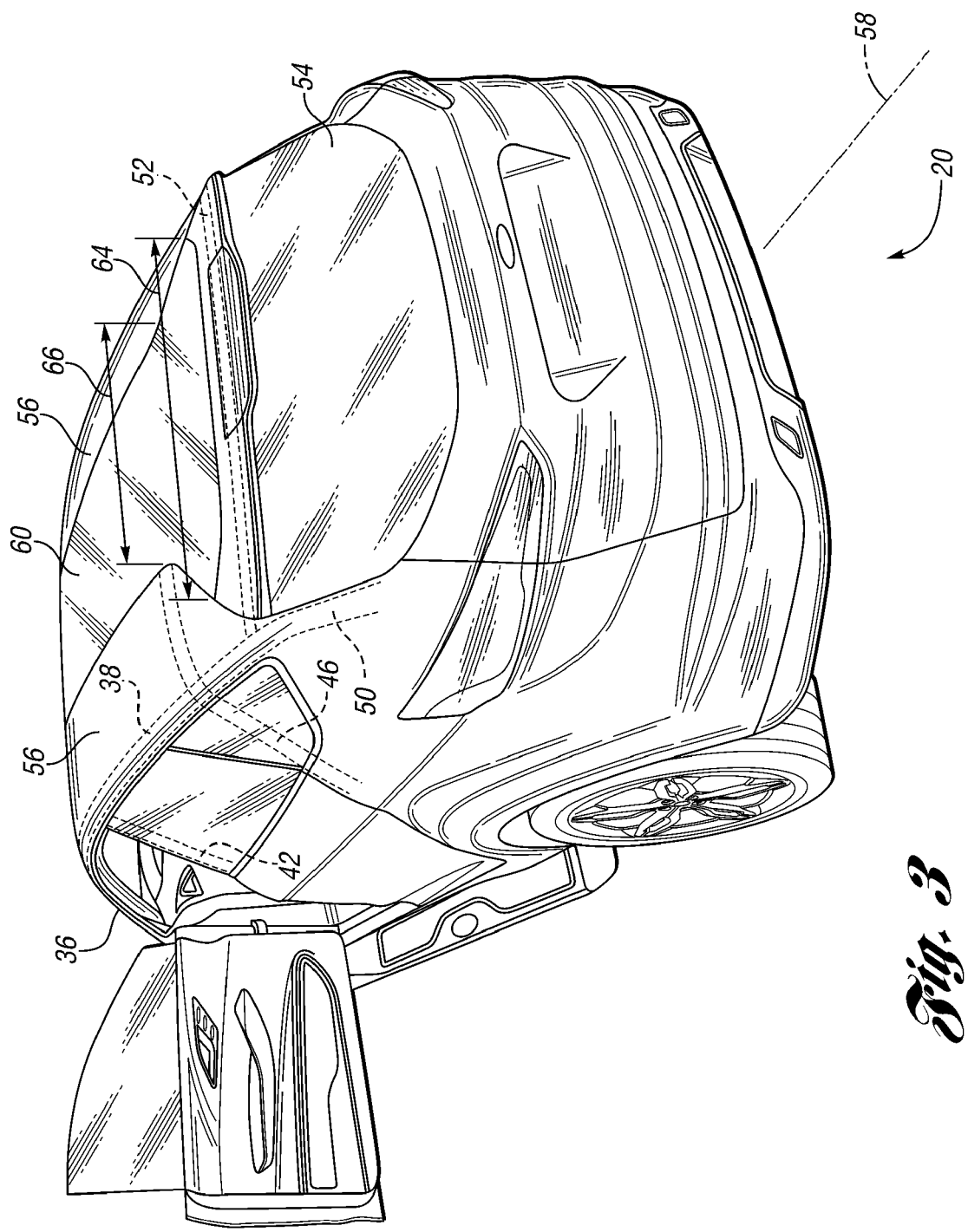
FIG. 3 is yet another perspective view of the vehicle with the pillar and roof structure as shown in FIG. 1.

A passenger vehicle 20 is illustrated in FIGS. 1-3 according to an embodiment. Although the vehicle 20 is illustrated as a four-door passenger vehicle, any passenger vehicle that employs a pillar structure is contemplated.

The passenger vehicle 20 has a vehicle body 22, which provides the body structure for the vehicle 20. The vehicle body 22 defines a passenger compartment 24 for housing passengers within the vehicle 20. The passenger compartment 24 is provided with a front seating row accessed through a front set of doors 26 and a rear seating row accessed through a rear set of doors 28 for transporting multiple rows of passengers.

A forward region of the passenger compartment 24 is bounded by a windshield 30. The windshield 30 is supported by a cross-member 32 of the vehicle body 22 that extends beneath the windshield 30. The windshield 30 is supported on lateral sides thereof by a pillar structure 34. The pillar structure 34 includes a pair of A-pillars 36 that extend upward and rearward from the cross-member 32 to a pair of rails 38 and on either side of the windshield 30.

A front header 40 is provided on the pillar structure 34 at the tops of the A-pillars 36, and at the end of the rails 38 for supporting the windshield 30.

In one embodiment, a pair of B-pillars 42 are each provided at the end of each of the rails 38 for extending downward to the vehicle body 22 for supporting the rails 38. The B-pillars 42 may be provided rearward of the front set of doors 26 for structurally supporting the front door opening 27 while permitting ingress and egress through the door opening 27. An intermediate header 43 may extend between the rails 38 and adjacent to the B-pillars 42 to provide structural support to the vehicle 20.

A pair of C-pillars, or intermediate pillars, 46 are each provided on the pillar structure 44 extending from the rails 38 down to the vehicle body 22. The C-pillars 42 are provided rearward of the rear set of doors 28 for structurally supporting the rear door opening 29 while permitting ingress and egress through the door opening 29. An intermediate header 48 is provided on the pillar structure 34 and extends between the rails 38 and adjacent to the C-pillars 46 to provide structural support to the vehicle 20.

A pair of D-pillars 50, or rear pillars, are each provided on the pillar structure 44 extending from the ends of the rails 38 down to the vehicle body 22. A rear header 52 is provided on the pillar structure 34 extending across the rear ends of the rails 38. The rear header 52 and the pair of D-pillars 50 support a rear window 54. The rear window 54 provides a rear viewing range for the occupants of the vehicle 20.

A pair of roof panels 56 are fastened to the rails 38 and headers 40, 48, 52. The roof panels 56 are formed in the same manner as other body panels of the vehicle 20, are opaque and are manufactured from metal, plastic, composite, or the like as is known in the art for body panels. Each roof panel 56 extends inboard from a respective rail 38. Each roof panel 56 extends from adjacent to one of the front headers 40 to adjacent to one of the rear headers 52. The roof panels 56 are spaced apart along a longitudinal axis 58 of the vehicle 20.

The roof panels 56 provide structural support to the vehicle 20 by carrying and distributing various vehicle 20 loads. The panels 56 provide additional support for the pillars, headers, and rails of the vehicle 20. For example, a load path includes the A-pillar 36 to the rail 38 and to roof panel 56 and then to the D-pillar 50 when a fore-aft load (in the direction of the longitudinal axis) is present on the vehicle 20.

A transparent roof panel 60 is interposed between the pair of roof panels 56. The transparent roof panel 60 is manufactured from glass, plastic, or other transparent or translucent materials. The transparent roof panel 60 extends from the front header 40 to the rear header 52. In one embodiment, the transparent roof panel adjoins the front windshield 30 such that the appearance of continuity is given to an outside observer of the vehicle 20. In other embodiments, the front header 40 and overlying body panel is visible from the exterior of the vehicle 20.

The transparent roof panel 60 has a first lateral width 62 adjacent to the front header 40. The lateral width of the transparent roof panel 60 lies in the same direction as the lateral axis of the vehicle 20, or perpendicular to the longitudinal axis 58 of the vehicle 20. The transparent roof panel 60 has a second lateral width 64 adjacent to the rear header 52. The second width 64 is greater than the first width 62. The pair of roof panels therefore extend farther inboard toward the vehicle longitudinal axis 58 (or centerline of the vehicle 20) adjacent to the front header 40 compared to adjacent to the rear header 52. The increased width of the transparent panel 60 in the rear section of the vehicle 20 provides for additional visibility for an occupant of the vehicle 20 looking aft or rearward.

The transparent roof panel 60 extends over the intermediate header 48 and any other intermediate headers that the vehicle 20 is provided with. The intermediate header 48 may additionally support the transparent roof panel 60. The transparent roof panel 60 has a lateral width 66 adjacent to the intermediate header 48 and the second lateral width 64 at a location aft of the intermediate header 48. In some embodiments, lateral width 62 of the transparent roof panel 60 and the lateral width 66 of the transparent roof panel are the same. Aft of the intermediate header, the width of the transparent panel 60 increases to reach the second lateral width 64. In one embodiment, the lateral width of the transparent panel 60 increases linearly between the intermediate header 48 and the rear header 52. In other embodiments, other functions for increasing the width of the transparent panel 60 are contemplated, such as curvilinear, noncontinuous, and the like.

In an embodiment, the rear header 52 is lower than the intermediate header 48, which causes the transparent roof panel 60 to slope downwardly towards the rear header 52. The downward slope of the transparent panel 60 provides further rearward visibility for the vehicle 20 occupants through the transparent roof panel 60 and additionally through the rear window 54.

The transparent panel 60 has an increased lateral width rearward in the vehicle 20. The width of the transparent panel 60 adjacent to the rear header 52 is similar in dimension to the adjacent width of the rear window 54. This creates, in effect, a larger viewing area for a vehicle 20 occupant to use when looking aft of the vehicle and provides improved rearward visibility. The pair of roof panels 56 extend partway across the roof to supplement the support provided by rails 38 and headers 40, 48, 52 and strengthen the vehicle 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a pair of front pillars extending upward from a vehicle body;
    a pair of rails extending rearward from the pair of front pillars;
    a pair of rear pillars extending downward and rearward from the pair of rails to the vehicle body;
    a pair of roof panels spaced apart along the vehicle body longitudinal axis, each panel extending inboard from a respective rail;
    a transparent roof panel interposed between the roof panels;
    a front header extending across the pair of front pillars or the pair of rails adjacent to the front pillars; and
    a windshield mounted to and supported by the front pillars, the windshield and the transparent roof panel adjoining one another.

2. The vehicle of claim 1 wherein the transparent roof panel provides additional visibility for an occupant of the vehicle; and
    wherein the pair of roof panels provide structural support for the vehicle.

3. The vehicle of claim 1 wherein each roof panel extends from adjacent to one of the front pillars to adjacent to a corresponding rear pillar.

4. The vehicle of claim 1 wherein each roof panel extends farther inboard at a location adjacent to the front pillars compared to a location adjacent to the rear pillars.

5. The vehicle of claim 1 wherein the transparent panel has a first width adjacent to the front pillars and a second width adjacent to the rear pillars.

6. The vehicle of claim 5 wherein the second width is greater than the first width.

7. The vehicle of claim 1 further comprising:
    a rear header extending across the pair of rear pillars or the pair of rails adjacent to the rear pillars; and
    a rear window mounted to and supported by the supported by the rear pillars, the rear header interposed between the rear window and the transparent roof panel.

8. The vehicle of claim 1 further comprising a pair of intermediate pillars interposed between the front pillars and rear pillars, the pair of intermediate pillars extending downward from the pair of rails to the vehicle body.

9. The vehicle of claim 8 wherein the pair of intermediate pillars are positioned aft of rear passenger entrances defined by the vehicle body.

10. The vehicle of claim 8 further comprising an intermediate header extending between the pair of intermediate pillars;
    wherein the transparent roof panel extends over and is supported by the intermediate header.

11. The vehicle of claim 10 wherein the transparent panel has a first width in front of the intermediate header and a second width aft of the intermediate header, the second width being greater than the first width.

12. A vehicle comprising:
    a pair of front pillars extending upward and rearward from a vehicle body;
    a pair of rails extending rearward from the pair of front pillars;
    a pair of rear pillars extending downward and rearward from the pair of rails to the vehicle body;
    a front header extending between the pair of front pillars;
    a rear header extending between the pair of rear pillars;
    a transparent roof panel extending from the front header to the rear header, the transparent roof panel having a first lateral width adjacent to the front header and a second lateral width adjacent to the rear header, the second lateral width greater than the first lateral width; and
    a pair of roof panels, each panel extending inboard from one of the rails to a corresponding side of the transparent roof panel.

13. The vehicle of claim 12 wherein the transparent roof panel provides visibility aft of the vehicle for an occupant of the vehicle.

14. The vehicle of claim 12 further comprising:
    a pair of intermediate pillars interposed between the front pillars and rear pillars, the pair of intermediate pillars extending downward from the pair of rails to the vehicle body; and
    an intermediate header extending between the pair of intermediate pillars;
    wherein the transparent panel extends over and is supported by the intermediate header.

15. The vehicle of claim 14 wherein the first lateral width of the transparent panel is adjacent to the intermediate header.

16. The vehicle of claim 14 wherein the lateral width of the transparent panel increases linearly between the intermediate header and the rear header.

17. The vehicle of claim 14 further comprising a rear window supported by and extending between the rear pillars and the rear header.

18. The vehicle of claim 17 wherein the rear header is lower than the intermediate header thereby causing the transparent roof panel to slope downwardly towards the read header; and
    wherein a vehicle occupant has rearward visibility through both the rear window and the transparent roof panel between the intermediate header and rear header.

19. A vehicle comprising:
    a vehicle body having at least a pair of door openings;
    a pair of front pillars extending upward and rearward from the vehicle body;
    a pair of rails extending rearward from the pair of front pillars;
    a pair of rear pillars extending downward and rearward from the pair of rails to the vehicle body;

a pair of roof panels, each panel extending inboard from a respective side rail, the pair of roof panels spaced apart along a longitudinal axis of the vehicle body; and a transparent roof panel interposed between the pair of roof panels;

wherein a lateral width of each of the roof panel decreases adjacent to the rear pillars.

* * * * *